Nov. 24, 1942. G. W. SCHWARZKOPF ET AL 2,303,234
VIBRATORY INSTRUMENT
Filed Dec. 6, 1940 2 Sheets-Sheet 1
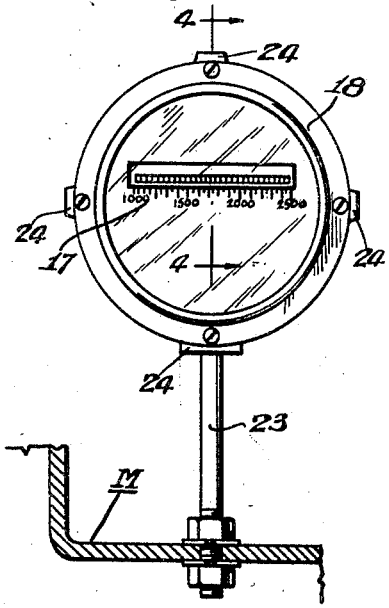
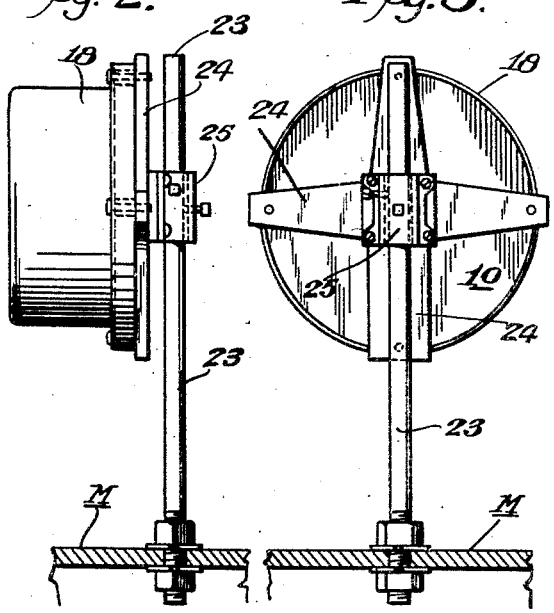
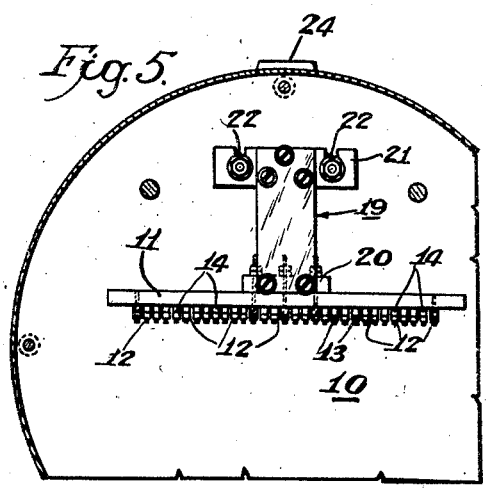
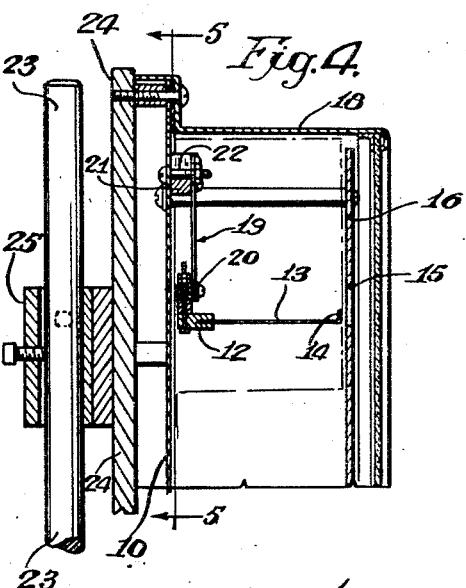
Inventors:—
Gerhard W. Schwarzkopf
Thomas Barclay Whitson
by their Attorneys
Howson & Howson Nov. 24, 1942.    G. W. SCHWARZKOPF ET AL    2,303,234
VIBRATORY INSTRUMENT
Filed Dec. 6, 1940    2 Sheets-Sheet 2
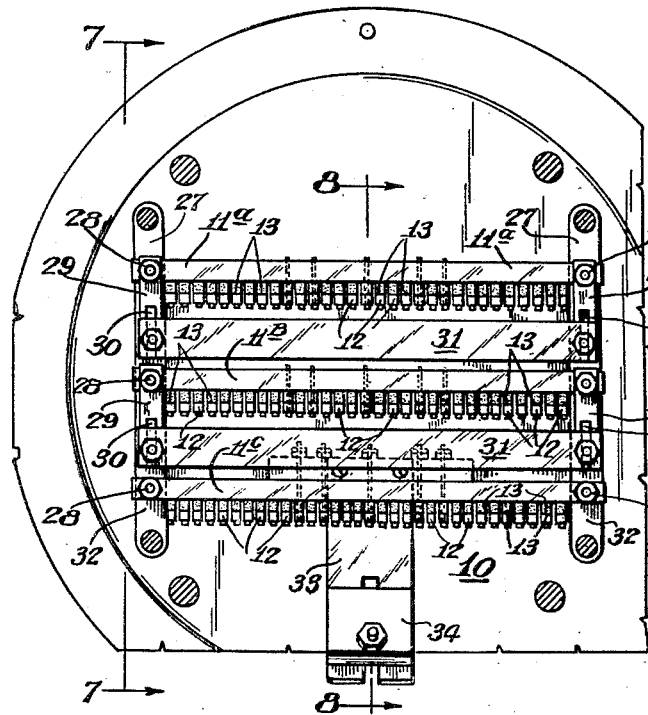
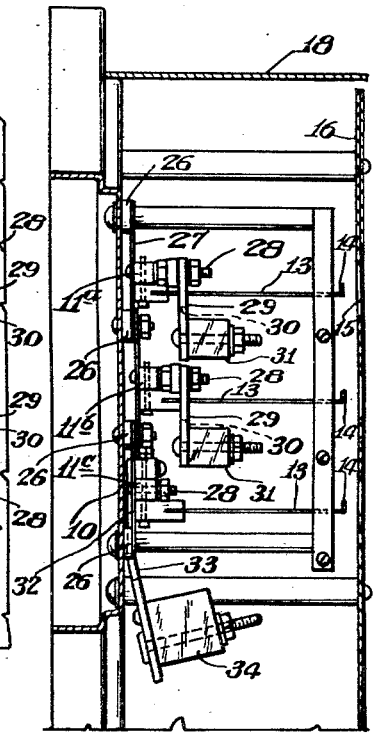
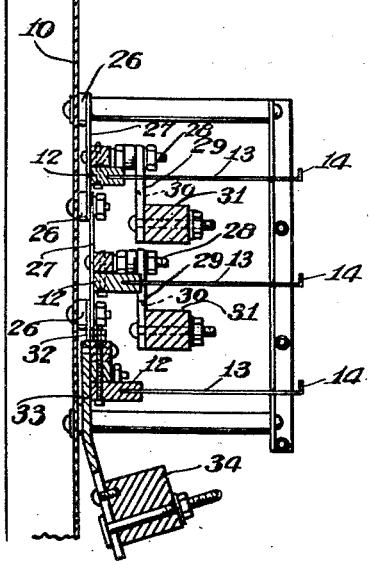

Patented Nov. 24, 1942

2,303,234

UNITED STATES PATENT OFFICE 2,303,234

VIBRATORY INSTRUMENT

Gerhard W. Schwarzkopf, Philadelphia, and Thomas Barclay Whitson, Moylan, Pa., assignors to James G. Biddle Co., Philadelphia, Pa., a corporation of Pennsylvania Application December 6, 1940, Serial No. 368,958

13 Claims. (Cl. 73—51)

This invention relates to vibrating-reed tachometers or vibration indicators of the Frahm type. Such an instrument comprises a set or series of differently tuned vibrating reeds associated with a scale and mounted in a suitable case, the entire instrument being affixed to a machine whose speed or rate of vibration of which is to be indicated, in such manner that the vibrations of the machine are imparted thereto. However, due to the fact that modern methods of balancing have, in large measure, eliminated vibration, the Frahm instrument occasionally proves ineffective in providing a reading.

An important object of the present invention is the provision of a tachometer or vibration indicator of this type, so constructed that the relatively small amount of vibration in the machine, and in particular at the point where it is desired to mount the instrument, may be amplified by and through the instrument and its support or supports, so that a satisfactory indication of speed or rate of vibration will be secured, and the instrument be made effective under circumstances where otherwise it would be useless.

A further object of the invention is the provision of a support, or supports, for the instrument so constructed as to not only contribute to the amplification of the vibration, but, too, permit of easy manual adjustment by the user or installer of the instrument to a point where optimum results are secured.

Another object of the invention is the provision of means for excluding alien vibrations which adversely affect the apparatus to the extent of rendering it ineffective.

A further object of the invention is the provision of amplificational devices of the type just described in a manner such that they may be incorporated readily in present instruments of the Frahm type without in large measure altering the construction thereof.

These and other objects are obtained by the construction shown in the accompanying drawings wherein, for the purpose of illustration, there have been illustrated preferred embodiments of the invention and wherein:

Fig. 1 is a front elevation of a tachometer constructed in accordance with the invention;

Fig. 2 is a side elevation thereof;

Fig. 3 is a rear elevation thereof;

Fig. 4 is an enlarged sectional view on line 4—4 of Fig. 1;

Fig. 5 is a section on line 5—5 of Fig. 4;

Fig. 6 is a plan view of a modified form of tachometer, the cover being removed;

Fig. 7 is a section on line 7—7 of Fig. 6; and

Fig. 8 is a section on line 8—8 of Fig. 6.

Referring now more particularly to the drawings, the numeral 10 generally designates a casing base. Suitably supported from this base is a reed bar 11 to which, through reed shoes 12, a series of differently tuned flexible reeds 13 are secured, the free terminals of the reeds being enlarged for ready visibility, as at 14, and associated with a slot 15 in a dial plate 16, the surface of which dial plate incorporates a scale designated at 17 in Fig. 1. The entire mechanism is housed by a cover 18 associated with the base in order to render the same dust-proof. The mechanism, insofar as just described, comprises the ordinary mechanism of the Frahm tachometer or vibration indicator, and it is obvious that the speed of operation or rate of vibration of a given machine may be determined by observing which of the tuned reeds are in maximum sympathetic vibration, or are most highly flexed in response to the vibration imparted to the instrument during the operation of the machine.

In order to render the operation of the Frahm instrument more sensitive, and to cause it to operate satisfactorily where the originating vibrations in the machine under test are of small amplitude, as in measuring speed or rates of vibration in modern smooth-running machines, the present invention contemplates a plurality of sympathetic or resonantly-vibrating elements mounted mechanically one upon the other in such a manner that the resonant vibration of the first element is amplified in the succeeding element, and so on until the amplitude of vibration induced in the set of tuned reeds, which constitutes the final element of the series, is sufficient for satisfactory visual observation.

In the form of invention shown in Figures 1 to 5 inclusive, a cantilever support 19 is rigidly attached at one end 20 to the reed bar and at its opposite end to a plate 21 affixed to the base 10, provision preferably being made for a slight adjustment of the attaching plate 21 as by means of the screw-and-slot adjustments indicated at 22. The cantilever arm is itself a spring strip and will have a certain vibratory moment which is preferably of such order that the reed system will be made to vibrate at a substantially uniform rate throughout the entire range of the reeds supported thereby. Obviously, by this means the movement of the reeds may be amplified and the tendency on the part of any particular reed to vibrate will be increased. It will be noted that the cantilever connection is such that a turning movement of the bar 11 occurs about its axis as a result of vibration of the cantilever, since this movement tends to amplify reed vibration to the greatest possible extent.

To provide for further amplification of such movement, the tachometer base, instead of being directly attached to the machine M, is attached thereto through a reed 23 which is at present shown as in the form of a steel bar fixed at its lower end to the machine M. A solid bracket 24 is adjustably mounted upon this reed as at 25. By adjustment of the effective length of reed 23, as determined by the position of the tachometer thereon, reed 23 may be made either to amplify the vibratory motion of the reeds 13 through the additional vibration imparted to cantilever reed 19, or may be made to exclude certain unwanted vibrations as, for example, those of an associated element of machine M or of a nearby machine. It will be obvious that since the support 23 is circular in cross section, the tachometer may be bodily rotatably adjusted thereabout, thereby minimizing its response to unwanted vibrations angularly related to those which are to be measured.

In the form of invention shown in Figs. 6 to 8 inclusive, there is illustrated a further method of applying the above principles to a tachometer, the invention in this instance being illustrated in conjunction with a wide-range tachometer having a plurality of reed bars 11a, 11b, 11c with their associated reeds. The mounting of the reed bars 11a, 11b is substantially identical, and the construction of but one thereof will be described.

The base 10 mounts from suitable studs 26 a flat leaf spring 27 which is rigidly affixed to the studs and one of which is arranged at each end of the reed bar. The reed bar 11a or 11b is fixed at its ends to the spring 27 at the center thereof as by means of screws 28 which also serve to affix to the spring at an elevation above the reed bar an arm 29 which parallels the spring and the end of which is slotted as at 30. The ends of these arms 29 receive the ends of a tuning weight 31, and through the adjustments, as at 30, the effective weighting of arms 29 may be regulated to thereby selectively regulate the moment of the spring-mounted levers employed in amplifying the movements of the reed bar. Weights 31, being of considerable length, rigidify the lever arm structure, of which they form a part, against vibrations longitudinal to the reed group which they control, thus eliminating any possible interference with proper response from transverse vibration components. It will also be obvious that this holds true of any relatively wide lever arm whether of the cantilever type or not which may be attached to the reed bar, since the rigidity of such lever arm may be made such in a direction axial to the reed bar that interference from unwanted transverse vibrations can be substantially eliminated. It is also possible to regulate the vibratory moment of the lever arm to a considerable extent by varying the thickness, strength or length of the spring mounting 27.

The construction just described may be conveniently employed particularly in the lower ranges of reed control, but in some instances it is preferred that the construction employed with the reed bar 11c be utilized. In this arrangement, the reed bar 11c is attached at its ends to an associated pair of flat springs 32 similar to those employed with reed bars 11a, 11b. The lever arm, however, is provided by attaching this arm 33 to the reed bar directly at the center thereof. An end of the arm is slotted, and a tuning weight 34 adjustably mounted upon the bar at this slot. It will be understood that a tachometer constructed in accordance with the showing in Figures 6 to 8 is preferably likewise mounted on a machine after the manner of mounting the tachometer of Figures 1 to 5.

It will be obvious that the constructions herein shown are capable of considerable modification, and that the principle of reed movement amplification herein described is capable of considerable extension. These illustrations will not, therefore, be considered as limiting except as set forth in the appended claims.

We claim:

1. In a vibratory instrument, a plurality of vibratory elements each sharply resonant at a different frequency within a predetermined frequency band, a common vibratory support member for said elements, said member being inherently broadly resonant over a frequency range including the band of frequencies at which said elements are individually resonant, a base mounting said elements and said support, a reed supporting said base and a connection between the reed and base adjustable along said reed.

2. In a vibratory instrument, a plurality of vibratory elements each sharply resonant at a different frequency within a predetermined frequency band, and a vibratory cantilever support for said elements, said cantilever support being inherently broadly resonant over a frequency range including the band of frequencies at which said elements are individually resonant.

3. In a vibratory instrument, a plurality of vibratory elements each sharply resonant at a different frequency, a common support engaging common portions of said vibratory elements, a vibratory member supporting said support and having engagement therewith whereby vibrations of said member cause an oscillation of the support in a direction having an oscillatory component about the axis of the support, a base mounting said elements for suporting the vibratory member, a reed supporting said base and a connection between said reed and said base adjustable along the reed.

4. In a vibratory instrument, a plurality of vibratory elements each sharply resonant at a different frequency, a common support engaging common portions of said vibratory elements, a vibratory member supporting said support and having engagement therewith whereby vibrations of said member cause an oscillation of the support in a direction having an oscillatory component about the axis of the support, said vibratory member being inherently broadly resonant over a frequency band including the frequencies of at least a portion of said vibratory elements, a base member mounting said elements, their support and the vibratory member, a reed supporting said base and a connection between said reed and said base adjustable along the reed.

5. The device of claim 2 wherein there is provided a base mounting said elements and said support, a reed supporting said base, and a connection between the reed and said base adjustable along said reed.

6. In a vibratory instrument, a plurality of vibratory elements each sharply resonant at a different frequency, a common support engaging common portions of said vibratory elements, a base, spring means on the base mounting said support, an arm projecting from the support, a weight on said arm and means to adjustably secure the weight in various positions upon the arm.

7. In a vibratory instrument, a plurality of vibratory elements each sharply resonant at a different frequency, a common support engaging common portions of said vibratory elements, a base, spring means on the base mounting said support, an arm projecting from the support, and a weight adjustable along said arm.

8. The device of claim 2 wherein there is provided a base mounting said elements and said support, a reed supporting said base, and a connection between the reed and said base adjustable along said reed and about the axis of said reed.

9. The structure of claim 2 wherein there is provided a base mounting said elements and said support, a reed supporting said base and a connection between the reed and said base adjustable rotatably on the reed.

10. In a vibratory instrument, a plurality of vibratory elements each sharply resonant at a different frequency, a common support engaging common portions of said vibratory elements, a vibratory member supporting said support and having engagement therewith whereby vibrations of said member cause an oscillation of the support in a direction having an oscillatory component about the axis of the support, a base mounting said elements and said support, a reed supporting said base and a connection between the reed and said base adjustable about the axis of said reed.

11. In a vibratory instrument, a plurality of vibratory elements each sharply resonant at a different frequency, a common support engaging common portions of said vibratory elements, a vibratory member supporting said support and having engagement therewith whereby vibrations of said member cause an oscillation of the support in a direction having an oscillatory component about the axis of the support, a base mounting said elements and said support, a reed supporting said base and a connection between the reed and said base adjustable about the axis of said reed and longitudinally of said reed.

12. In a vibratory instrument, a plurality of vibratory elements each sharply resonant at a different frequency, a common support engaging common portions of said vibratory elements, a vibratory member supporting said support and having engagement therewith whereby vibrations of said member cause an oscillation of the support in a direction having an oscillatory component about the axis of the support, said vibratory member being broadly resonant over a frequency band including the frequencies of at least a portion of said vibratory elements, a base mounting said elements for supporting the vibratory member, a reed supporting said base and a connection between said reed and said base adjustable about the axis of said reed.

13. In a vibratory instrument, a plurality of vibratory elements each sharply resonant at a different frequency, a common support engaging common portions of said vibratory elements, a vibratory member supporting said support and having engagement therewith whereby vibrations of said member cause an oscillation of the support in a direction having an oscillatory component about the axis of the support, said vibratory member being broadly resonant over a frequency band including the frequencies of at least a portion of said vibratory elements, a base mounting said elements for supporting the vibratory member, a reed supporting said base and a connection between said reed and said base adjustable about the axis of said reed and longitudinally of the reed.

GERHARD W. SCHWARZKOPF.
THOMAS BARCLAY WHITSON.